United States Patent

Ichikawa et al.

[11] Patent Number: 6,041,653
[45] Date of Patent: Mar. 28, 2000

[54] ACCELERATION SENSOR AND A METHOD OF PRODUCING SAME

[75] Inventors: Junichi Ichikawa; Seiki Kodama, both of Tokyo, Japan

[73] Assignee: Mitsubishi Denki Kabushiki Kaisha, Tokyo, Japan

[21] Appl. No.: 08/992,514

[22] Filed: Dec. 17, 1997

[30] Foreign Application Priority Data

Sep. 18, 1997 [JP] Japan .................................. 9-253312

[51] Int. Cl.⁷ .................................................. G01P 15/125
[52] U.S. Cl. ...................................................... 73/514.32
[58] Field of Search ........................... 73/514.32, 514.36, 73/514.35, 514.21, 514.18, 514.17, 514.16, 514.01; 361/283.3, 283.2

[56] References Cited

U.S. PATENT DOCUMENTS

| | | | |
|---|---|---|---|
| 4,711,128 | 12/1987 | Boura ..................................... | 73/514.21 |
| 5,095,752 | 3/1992 | Suzuki et al. ......................... | 73/514.32 |
| 5,151,763 | 9/1992 | Marek et al. ............................. | 357/26 |
| 5,350,189 | 9/1994 | Tsuchitani et al. .................. | 73/514.32 |
| 5,503,017 | 4/1996 | Mizukoshi ............................ | 73/514.36 |
| 5,561,248 | 10/1996 | Negoro ................................. | 73/514.32 |
| 5,618,989 | 4/1997 | Marek ..................................... | 73/1.38 |
| 5,719,336 | 2/1998 | Ando et al. ........................... | 73/514.32 |

Primary Examiner—Richard A. Moller
Attorney, Agent, or Firm—Sughrue, Mion, Zinn, Macpeak & Seas, PLLC

[57] ABSTRACT

An acceleration sensor including: a fixed substrate; a fixed electrode mounted on the fixed substrate; a movable body, supported by the fixed substrate and displaced in response to an applied acceleration; a movable electrode which is arranged in the movable body in such a manner that the movable electrode faces the fixed electrode to form, together with the fixed electrode, a capacitor; wherein the movable electrode is mounted between grooves formed in the movable body. The acceleration sensor features improved mechanical strength, compact design and improved sensing accuracy while permitting the manufacturing process to be simplified.

6 Claims, 8 Drawing Sheets

PRIOR ART

ACCELERATION SENSOR AND A METHOD OF PRODUCING SAME

BACKGROUND OF THE INVENTION

1. Field of the Invention

The present invention relates to an acceleration sensor for sensing an acceleration based on a variation in capacitance, and to a method of producing same.

2. Description of the Related Art

Figure 12:
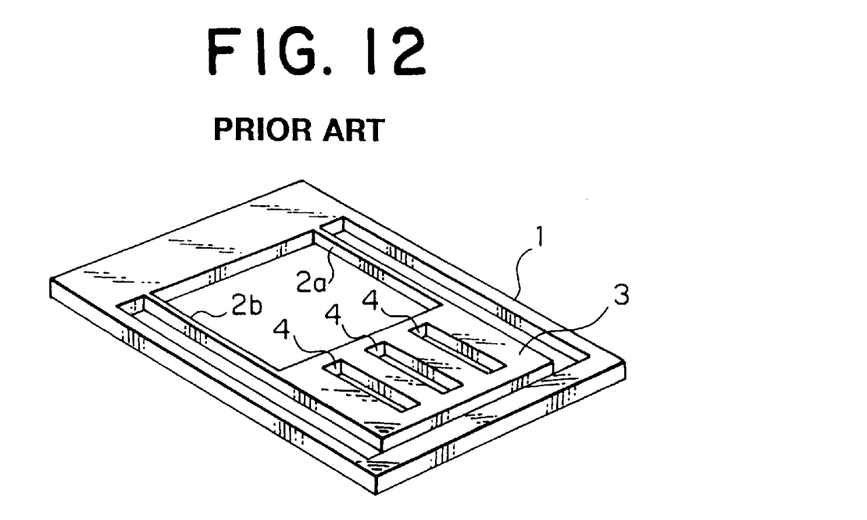
FIG. 12 is a perspective view of a movable body of a conventional acceleration sensor.
Figure 13:
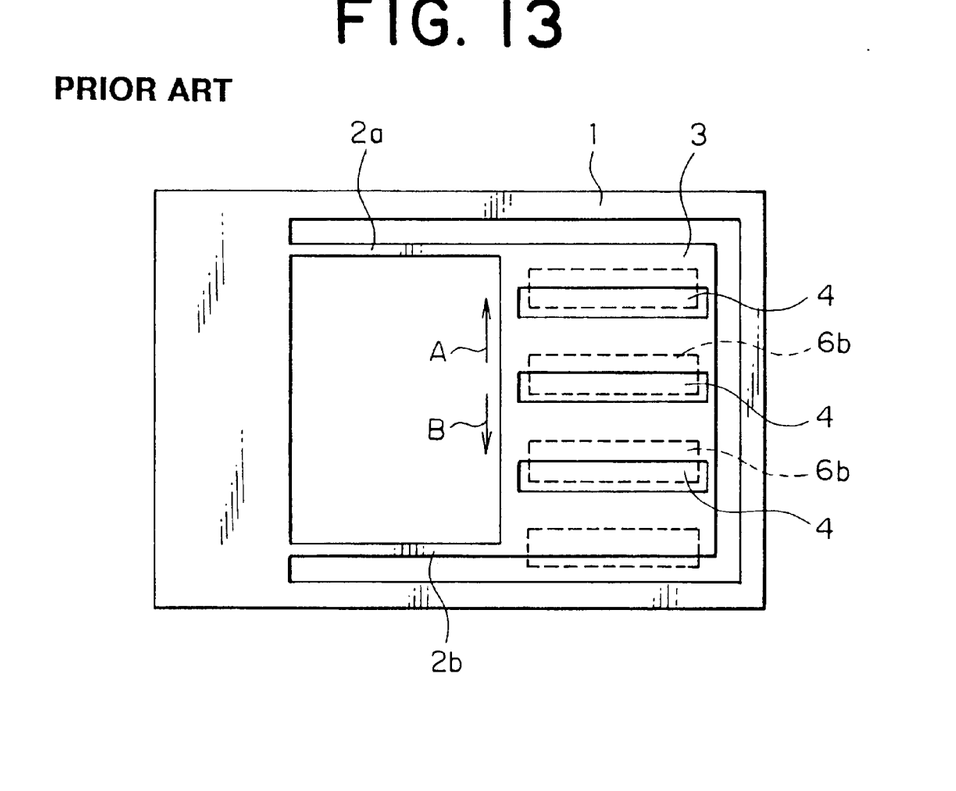
FIG. 13 is a plan view of the acceleration sensor of FIG. 12.
Figure 14:
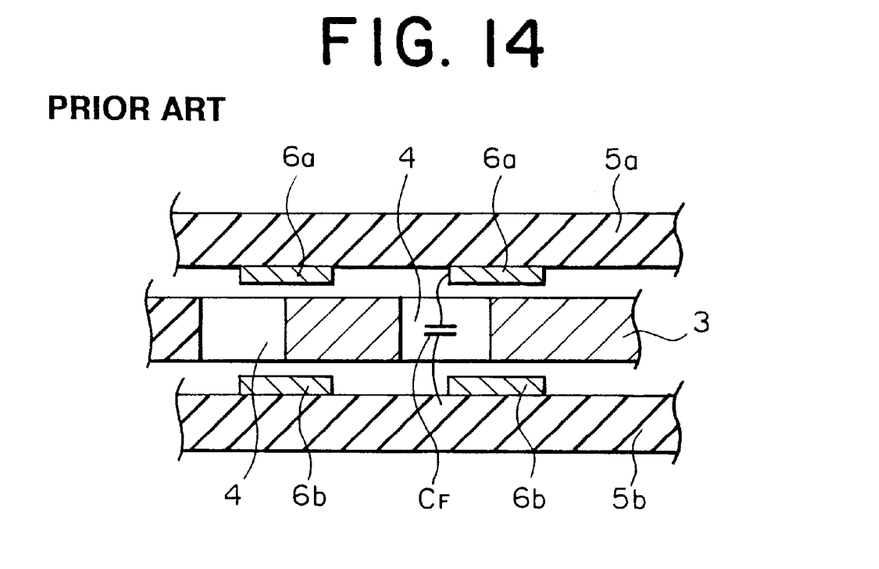
FIG. 14 is a cross-sectional view of an essential portion of the acceleration sensor of FIG. 12.

FIG. 12 is a perspective view of a movable body in a conventional acceleration sensor disclosed in Japanese Patent Application Laid-open No. 8-21852, FIG. 13 is a plan view of the movable body of FIG. 12, and FIG. 14 is a sectional view of an essential portion of the acceleration sensor that incorporates the movable body of FIG. 12.

The acceleration sensor comprises a frame substrate 1, a dielectric movable body 3 having slits 4 therein, connected to the frame substrate 1 by a first beam portion 2a and a second beam portion 2b, a first fixed substrate 5a and a second fixed substrate 5b, both of which are manufactured of an insulating material such as ceramic and between which the frame substrate 1 is interposed, a plurality of first electrodes 6a arranged along the first fixed substrate 5a, and a plurality of second electrodes 6b arranged along the second fixed substrate 5b facing the first electrodes 6a respectively.

A capacitor C is formed by facing first and second electrodes 6a, 6b towards each other, and is electrically connected in series to another capacitor C that is formed by towards each other facing adjacent first and second electrodes 6a, 6b.

When the acceleration sensor thus constructed is under acceleration which acts on the movable body 3 in the direction of the arrow A or B as shown in FIG. 13, the movable body is displaced according to the magnitude of the acceleration in the direction of the arrow A or B. The displacement of the movable body 3 changes the ratio of the dielectric areas of the movable body 3 between the slits 4 to the first electrodes 6a and the second electrodes 6b, thereby changing the capacitance of the capacitor C. The variation in capacitance is output as a voltage that is proportional to the acceleration applied to the movable body 3.

In the acceleration sensor thus constructed, the movable body 3, that is displaced in response to the applied acceleration, has a plurality of slits 4. Therefore, the mechanical strength of the movable body 3 is low and it is likely to be damaged by any impact during manufacturing.

The movable body 3 is displaced in response to the acceleration applied to the movable body 3 against the elasticity of the beams 2a, 2b. Thus in order to displace the movable body 3 a large amount, the movable body 3 needs to have a certain degree of heaviness. The volume of the movable body 3 having the slits 4 is thus increased, thereby making the entire acceleration sensor bulky.

Also, since the fixed substrates 5a, 5b are provided with the electrodes 6a, 6b, the manufacturing process is accordingly complicated.

If, for example, a charge is generated in the second fixed substrate 5b as shown in FIG. 14, for example, a stray capacity $C_F$ is formed between the first electrode 6a and the second fixed substrate 5b. When the capacitance of the stray capacity $C_F$ is substantially large enough to not be negligible in compared to the capacitance of the capacitor C that varies under acceleration, the acceleration sensing accuracy is adversely affected.

SUMMARY OF THE INVENTION

The present invention has been developed with a view to resolve the above problems, and it is an object of the present invention to provide an acceleration sensor that is compact and mechanically strong, and to provide a method of producing such an acceleration sensor.

It is another object of the present invention to provide an acceleration sensor that permits a simple manufacturing process and that offers improved sensing accuracy, and to provide a method of manufacturing it.

According to a first aspect of the present invention, the acceleration sensor comprises a fixed substrate, a fixed electrode mounted on the fixed substrate, a movable body, supported by the fixed substrate and displaced in response to an acceleration exerted, and a movable electrode which is arranged in the movable body in such a manner that the movable electrode faces the fixed electrode to form, together with the fixed electrode, a capacitor, wherein the movable electrode is mounted in between grooves formed in the movable body.

According to a second aspect of the present invention, the movable electrode is manufactured of the same material as the movable body.

According to a third aspect of the present invention, the movable body is manufactured of a silicon monocrystal.

According to a fourth aspect of the present invention, the movable electrode is manufactured of an electrically conductive metal film.

According to a fifth aspect of the present invention, the depth of the grooves is at least 10 times as great as the distance between the movable electrode and the fixed electrode.

According to a sixth aspect of the present invention, the width across the movable electrode is substantially equal to the width across the fixed electrode.

According to a seventh aspect of the present invention, the groove is expanded at the bottom to be wider than at the top.

According to an eighth aspect of the present invention, the method of producing an acceleration sensor comprises the steps of: forming a first etching resistive film on a silicon monocrystalline substrate on the area that is to become the movable electrode; forming grooves in the silicon crystalline substrate using anisotropic etching; stripping the first etching resistive film; enlarging the bottom of the grooves by isotropic etching with the side walls of the grooves covered with a second etching resistive film; and stripping the second etching resistive film.

According to a ninth aspect of the present invention, the method of producing the acceleration sensor comprises: the step of forming, on a silicon crystalline substrate, a metal film that is to become the movable electrode; and the step of forming grooves in the silicon monocrystalline substrate by isotropic etching.

BRIEF DESCRIPTION OF THE DRAWINGS

FIGS. 10(a)–10(f) show the manufacturing steps for a movable body of an acceleration sensor according to a fourth embodiment of the present invention;

FIGS. 11(a)–11(c) show the manufacturing steps for a movable body of an acceleration sensor according to a fifth embodiment of the present invention;

DESCRIPTION OF THE PREFERRED EMBODIMENTS

First Embodiment

Figure 1:
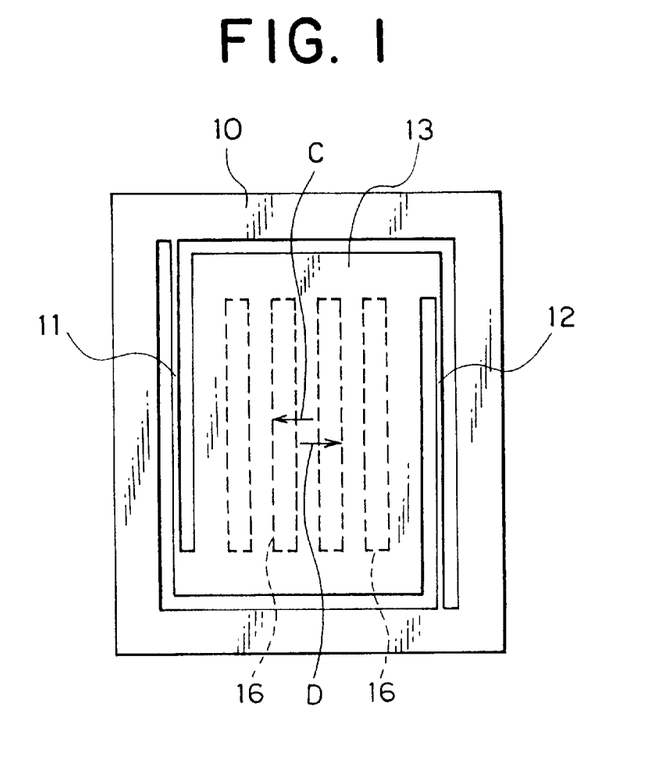
FIG. 1 is a plan view of a movable body of an acceleration sensor according to a first embodiment of the present invention.
Figure 2:
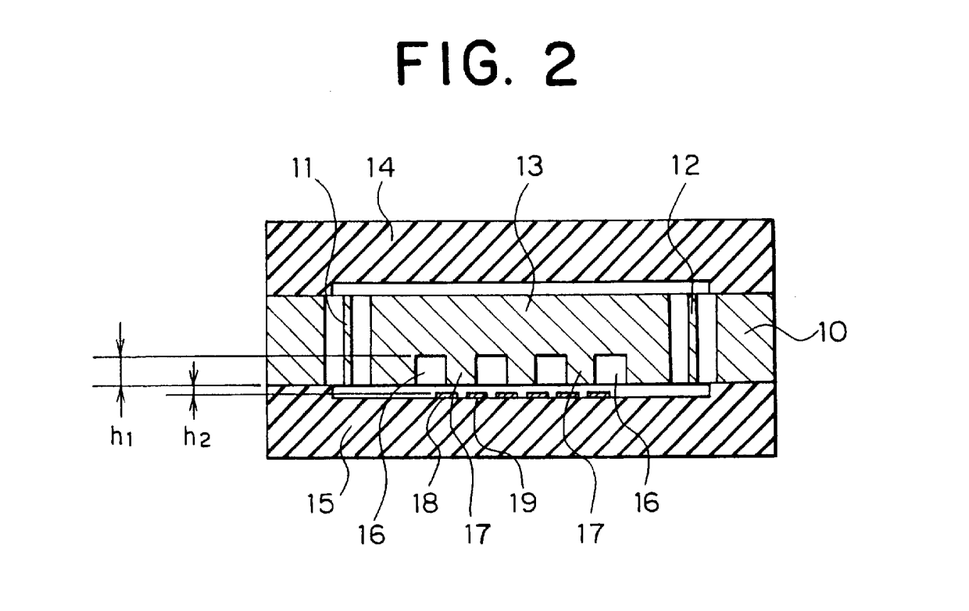
FIG. 2 is a cross-sectional view of an essential portion of the acceleration sensor of FIG. 1.

FIG. 1 is a plan view of a movable body of an acceleration sensor according to a first embodiment of the present invention, and FIG. 2 is a cross-sectional view of an essential portion of the acceleration sensor of FIG. 1.

The acceleration sensor comprises: a frame substrate 10; a first beam portion 11 and a second beam portion 12, both of which are connected to the frame substrate 10 in a manner that allows both beams 11, 12 to be deflected; a movable body 13 connected to the first beam portion 11 and second beam portion 12; and a first fixed substrate 14 and a second fixed substrate 15, both of which are manufactured of an insulating material such as glass and sandwich the frame substrate 10 from above and below, respectively.

The frame substrate 10, beam portions 11, 12, and movable body 13 are integrally manufactured of the same silicon monocrystal. On the side facing the second fixed substrate 15, the movable body 13 has a plurality of grooves 16 that are formed by etching, and also has silicon monocrystalline movable electrodes 17 between each respective groove 16.

Figure 3:
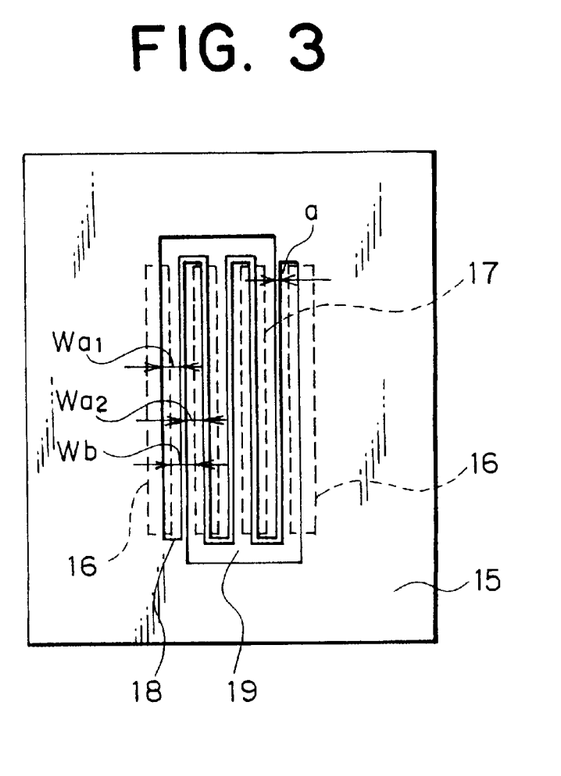
FIG. 3 is a plan view of a second fixed substrate of acceleration sensor of FIG. 1.

On the side facing the grooves 16 of the movable body 13, the second fixed substrate 15 has first and second fixed electrodes 18, 19 manufactured of platinum. Comb-like first and second fixed electrodes 18, 19 are arranged interdigitally as shown in FIG. 3. Each of the width $Wa_1$, $Wa_2$ of the first and second fixed electrodes 18, 19 is substantially equal to the width Wb across the movable electrodes 17. As shown in FIG. 3, the positional relationship of the first fixed electrodes 18, second fixed electrodes 19, and movable electrodes 17 is such that the longitudinal center line of the gap a between one first fixed electrode 18 and an adjacent second fixed electrode 19 is aligned with the longitudinal center line of a respective movable electrode 17 when no acceleration is applied. The depth $h_1$ of each groove 16 is at least 10 times as great as the distance $h_2$ between the movable electrodes 17 and the fixed electrodes 18, 19.

Figure 4:
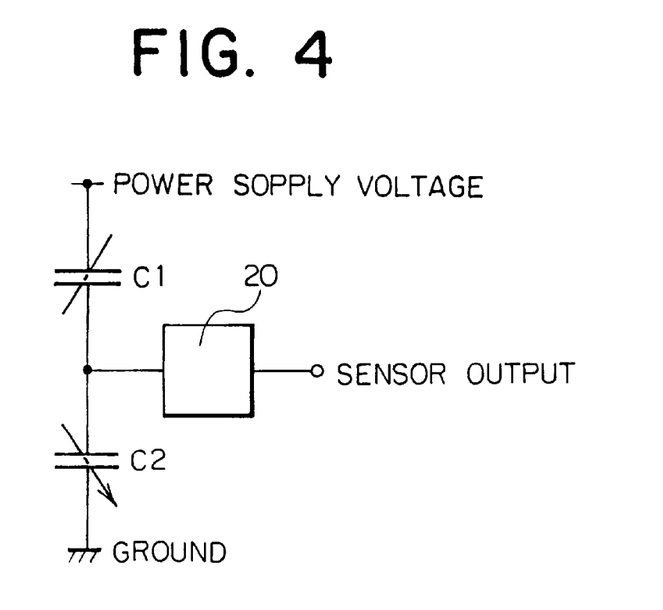
FIG. 4 is an equivalent circuit diagram of the acceleration sensor of FIG. 1.

FIG. 4 is an equivalent circuit diagram of the acceleration sensor of FIG. 1. A capacitor C1 formed by the movable electrodes 17 and the first fixed electrode 18 is connected to a power supply voltage. A capacitor C2 formed by the movable electrodes 17 and the second fixed electrodes 19 is connected between the capacitor C1 and ground. The capacitors C1, C2 are connected to an impedance converter circuit 20, which creates a voltage corresponding to the capacitance difference between capacitors C1, C2.

The operation of the acceleration sensor thus constructed will now be discussed.

When an acceleration acts on the movable body 13 in the direction of arrow C as shown in FIG. 1, the first beam portion 11 and second beam portion 12 are deflected and the movable body 13 is displaced in the same direction. As a result, the surface areas of the movable electrodes 17 facing the first fixed electrode 18 increase, the capacitance of the capacitor C1 increases, the surface areas of the movable electrodes 17 facing the second fixed electrode 19 decrease, and the capacitance of the capacitor C2 decreases.

The capacitance difference between capacitors C1, C2 is converted by the impedance converter circuit 20 into a voltage signal which is proportional to the acceleration exerted on the movable body 13, and the acceleration exerted on the movable body 13 is thus sensed.

When an acceleration acts on the movable body 13 in the direction of arrow D as shown in FIG. 1, the surface areas of the movable electrodes 17 facing the first fixed electrode 18 decrease, the capacitance of the capacitor C1 decreases, the surface areas of the movable electrodes 17 facing the second fixed electrode 19 increase, and the capacitance of the capacitor C2 increases.

The capacitance difference between both capacitors C1, C2 is converted by the impedance converter circuit 20 into a voltage signal which is proportional to the acceleration exerted on the movable body 13, and the acceleration exerted on the movable body 13 is thus sensed.

Second Embodiment

Figure 5:
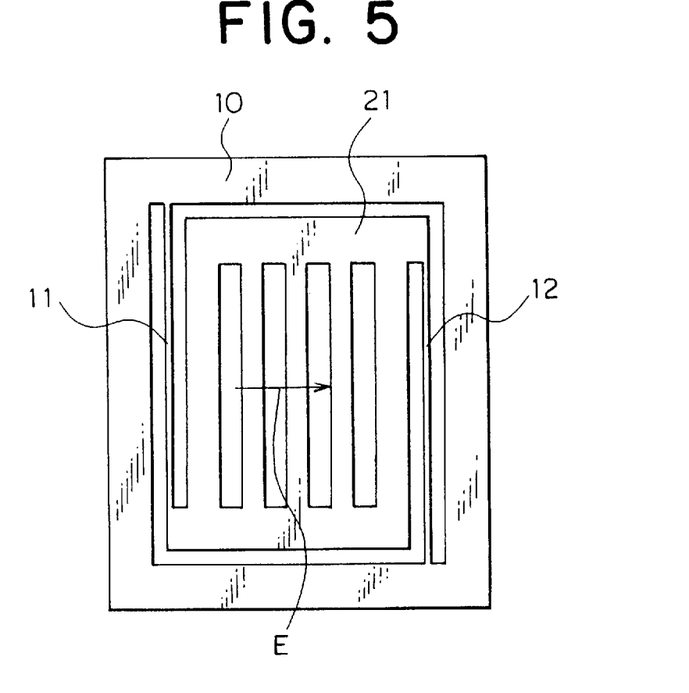
FIG. 5 is a plan view of a movable body of an acceleration sensor according to a second embodiment of the present invention.
Figure 6:
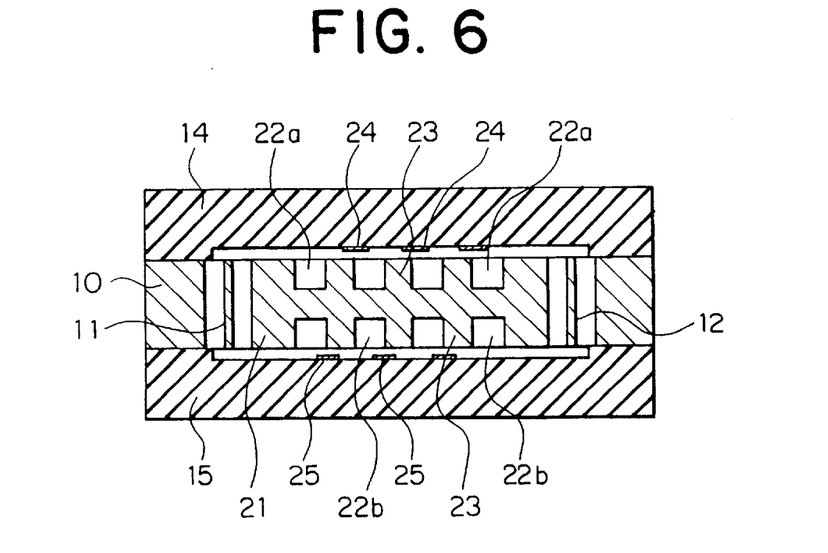
FIG. 6 is a cross-sectional view of an essential portion of the acceleration sensor of FIG. 5.

FIG. 5 is a plan view of a movable body of an acceleration sensor according to a second embodiment of the present invention, and FIG. 6 is a cross-sectional view of an essential portion of the acceleration sensor of FIG. 5.

In this embodiment a silicon crystalline movable body 21 has grooves 22a and 22b each on one side, respectively, with movable electrodes 23 formed between respective grooves 22a, 22b. The first fixed substrate 14 is provided with a plurality of first fixed electrodes 24 manufactured of platinum, for example. The second fixed substrate 15 is provided with a plurality of fixed electrodes 25 manufactured of platinum, for example.

When an acceleration is applied to the movable body 21 in the direction of arrow E as shown in FIG. 5, the surface areas of the movable electrodes 23 facing the first fixed electrodes 24 increase, the capacitance of the capacitor Cl increases, the surface areas of the movable electrodes 23 facing the second fixed electrodes 25 decrease, and the capacitance of the capacitor C2 decreases.

The rest of the operation and construction of this embodiment is identical to that of the first embodiment, and further discussion about it is omitted.

Third Embodiment

Figure 7:
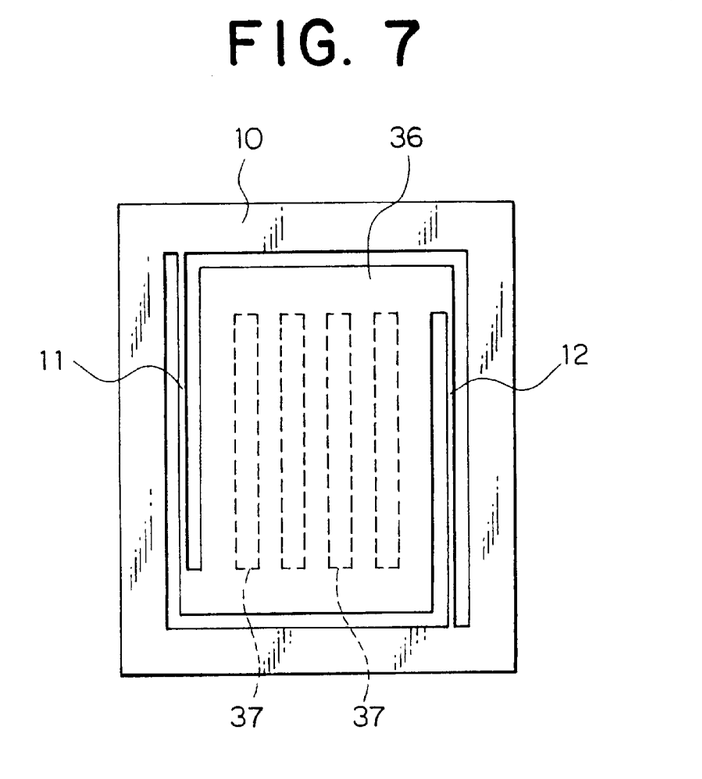
FIG. 7 is a plan view of a movable body of an acceleration sensor according to a third embodiment of the present invention.
Figure 8:
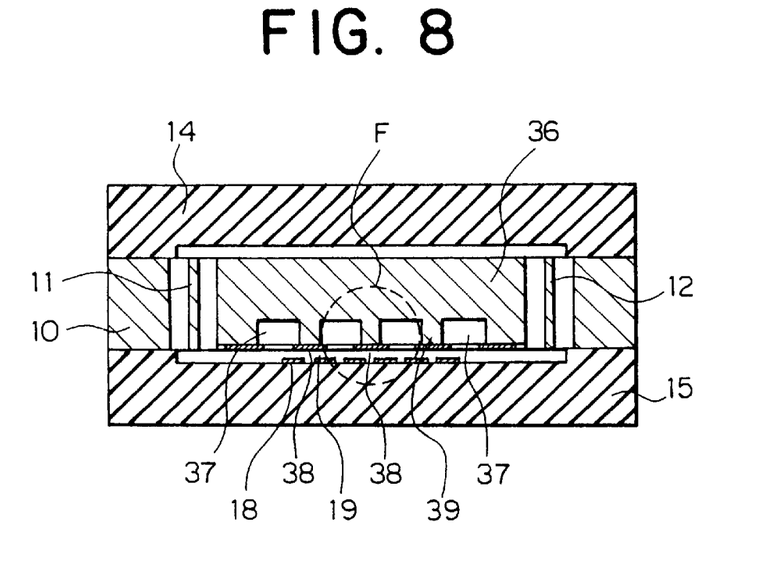
FIG. 8 is a cross-sectional view of an essential portion of the acceleration sensor of FIG. 7.
Figure 9:
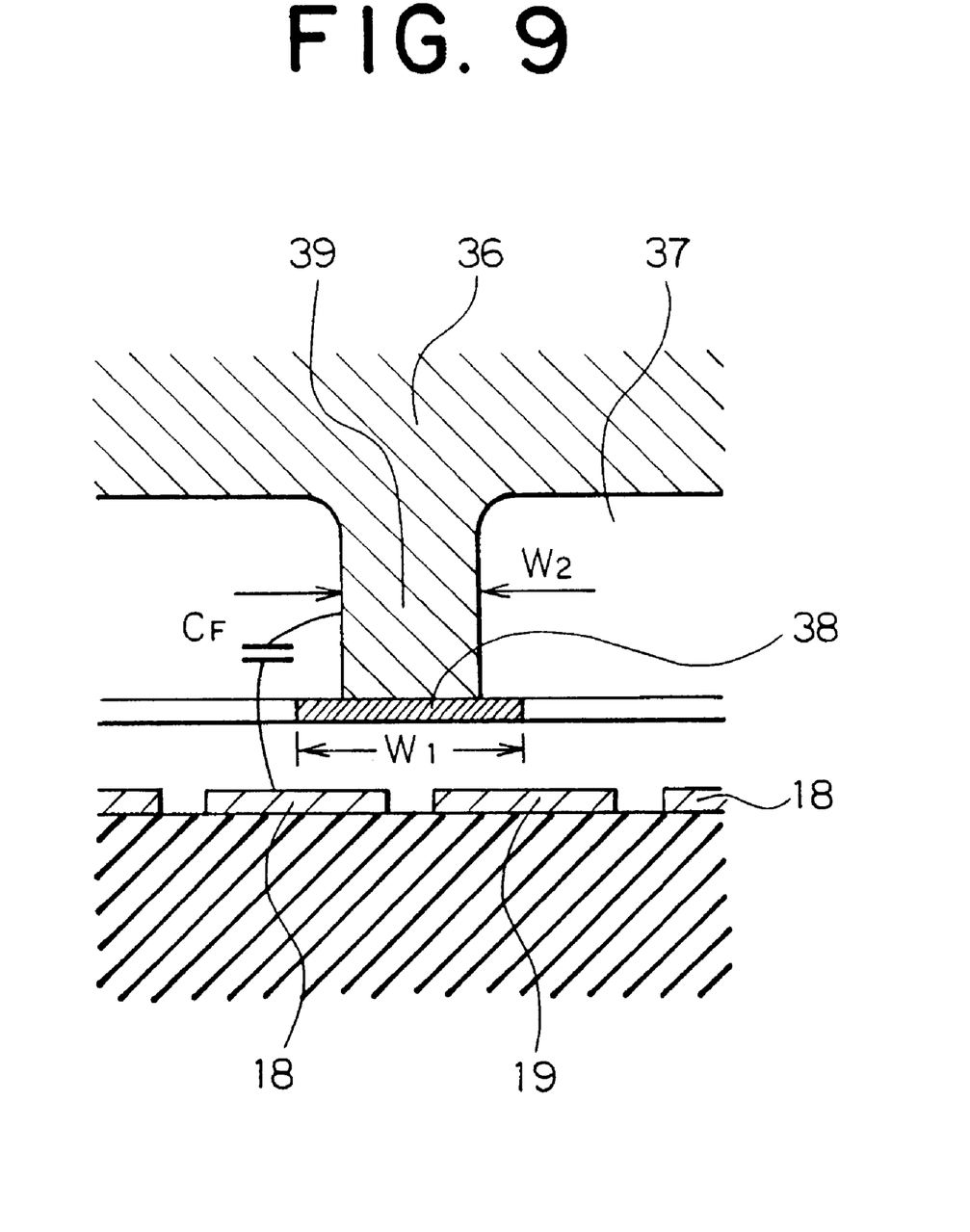
FIG. 9 is an enlarged view of the portion F shown in FIG. 8.

FIG. 7 is a plan view of a movable body of an acceleration sensor according to a third embodiment of the present invention, FIG. 8 is a cross-sectional view of an essential portion of the acceleration sensor of FIG. 7, and FIG. 9 is an enlarged view of the portion F shown in FIG. 8.

In this embodiment, a movable electrode 38, manufactured of a platinum film, is formed on each projection 39 between grooves 37 of a movable body 36. The width $W_1$ across the movable electrode 38 is wider than the width $W_2$ across the projection 39. Even if a charge generated on a wall of the projection 39 creates a stray capacity $C_F$ between the wall of the projection 39 and the first fixed electrodes 18, from an electrical standpoint, the distance between the projection 39 and the first fixed electrodes 18 is increased, the magnitude of the stray capacity $C_F$ is decreased, and the performance of the acceleration sensor is thus prevented from decreasing.

The rest of the construction and operation of the third embodiment is identical to that of the first embodiment.

The movable electrode of metal film may have the same width as the projection.

Fourth Embodiment

FIGS. 10(a)–10(f) show a manufacturing process for the movable electrodes of a movable body of an acceleration sensor according to a fourth embodiment of the present invention. The manufacturing process will now be discussed referring to FIGS. 10(a)–10(f).

Figure 10:
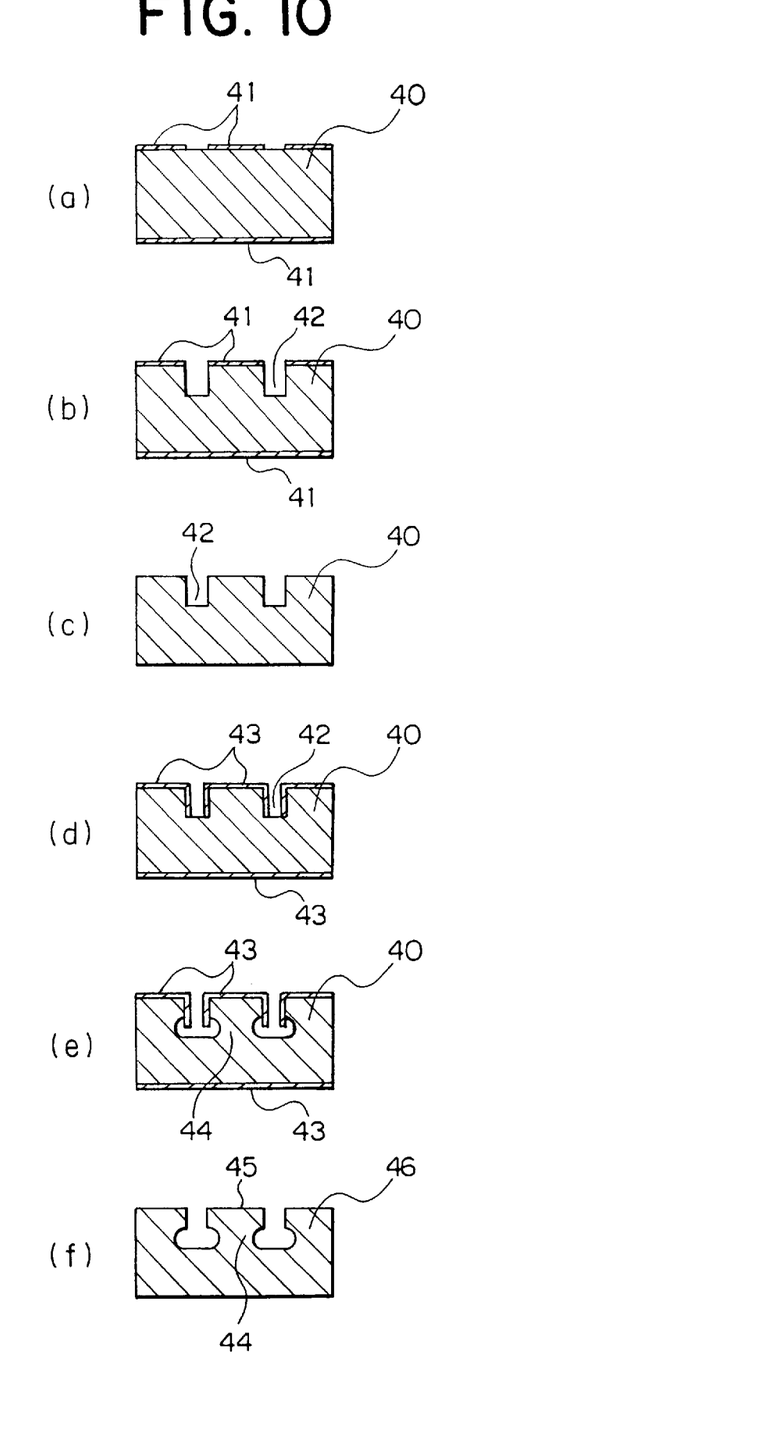

A first etching resistive film 41, such as a chromium film, is formed on top of a silicon crystalline substrate 40 except on the area which is to be etched (FIG. 10 (a)). The surface of the silicon crystalline substrate 40 is anisotropically etched by a strong alkali etchant such as a KOH water solution to form grooves 42, and the first etching resistive film 41 is then stripped (FIGS. 10(b) and 10(c)). A second etching resistive film 43 of $SiO_2$ or SiN is formed on the walls of the grooves 42, the surface to be used as the movable electrode and the rear face of the silicon crystalline substrate 40 (FIG. 10(d)). The silicon crystalline substrate 40 is then isotropically etched by a strong acid water solution such as a mixture of nitric acid and hydrofluoric acid to expand the bottom portion of the groove 42 to form a neck portion 44 between the grooves 42 (FIG. 10(e)). Stripping the second etching resistive film 43 (FIG. 10(f)) results in a movable body 46 with the movable electrode 45 connected to the neck portion 44. Even with the second etching resistive film 43 not stripped, the movable body 46 can perform its function.

In the movable body 46 thus constructed, the movable electrode 45 is connected to the neck portion 44. Even if a charge generated on a side wall of the neck portion 44 creates a stray capacity between the side wall and the fixed electrodes, the distance between the neck portion 44 and the fixed electrodes is increased. The magnitude of the stray capacity is decreased, and the performance of the acceleration sensor is thus prevented from decreasing.

Fifth Embodiment

Figure 11:
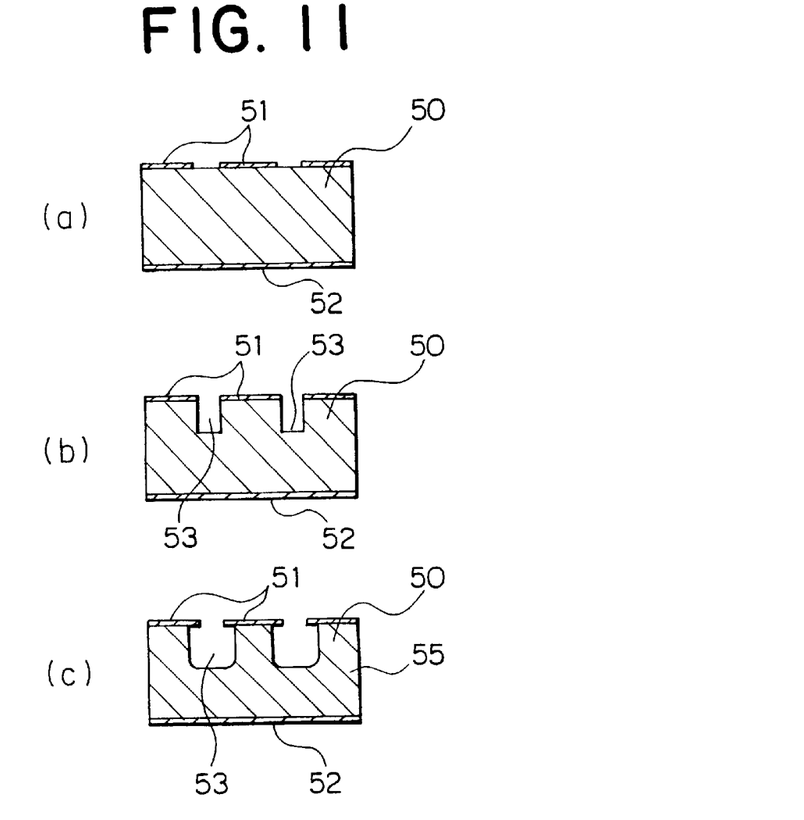

FIGS. 11(a)–11(c) show the manufacturing process for the movable body of an acceleration sensor according to a fifth embodiment of the present invention. The manufacturing process will now be discussed referring to FIGS. 11(a)–10(c).

A first etching resistive film 51 of platinum, for example, is formed on the top surface of a silicon crystalline substrate 50, and a second etching resistive film 52 of platinum is formed on the rear face of the silicon crystalline substrate 50 (FIG. 11(a)). The surface of the silicon crystalline substrate 50 is anisotropically etched by a strong alkali etchant, such as a KOH water solution, to form grooves 53 having a predetermined depth. The silicon crystalline substrate 50 is then isotropically etched by a strong acid water solution, such as a mixture of nitric acid and hydrofluoric acid, to a predetermined depth (FIG. 11(c)).

The first etching resistive film 51 works as a etching mask during the anisotropic etching process shown in FIG. 11(b), and the isotropic etching process shown in FIG. 11(c), and is not stripped after the etching processes to function as a movable electrode.

A movable body 55 thus constructed has the first etching resistive film 51 (movable electrode) between grooves 53 and the first resistive film 51 has a width wider than that of the groove 53. As previously described in connection with the third embodiment, even if a charge generated on a side wall of the groove 53 creates a stray capacity between a side wall and the fixed electrodes, the distance between the side wall and the fixed electrodes is increased. The magnitude of the stray capacity is decreased, and the performance of the acceleration sensor is thus prevented from decreasing.

According to the first aspect of the present invention, the acceleration sensor comprises: the fixed substrate; the fixed electrode mounted on the fixed substrate; the movable body, supported by the fixed substrate and displaced in response to an acceleration; and the movable electrodes which are arranged in the movable body in such a manner that the movable electrode faces the fixed electrode to form, together with the fixed electrode, a capacitor; wherein the movable electrodes are mounted between grooves formed in the movable body. Compared with the conventional movable body having slits, the movable body of the present invention has increased mechanical strength and is less subject to damage during the manufacturing process, for example.

Further, regardless of its compact size, the movable body can be made to a predetermined weight, and the acceleration sensor can thus be made more compact.

Since the movable body has grooves rather than through-slits, sit requires shorter etching time than one having through-slits. With a small amount to be etched, variation in the width of the movable electrode is reduced and sensing accuracy can be thus increased.

According to the second aspect of the present invention, the movable electrode are manufactured of the same material as the movable body. The movable electrode are easily formed by forming the grooves in the movable body. Compared to the conventional acceleration sensor having a pair of fixed substrates each having its own electrodes, the sensor of the present invention permits a simplified manufacturing process.

According to the third aspect of the present invention, the movable body is manufactured of a silicon monocrystal. A low-cost acceleration sensor with high sensing accuracy results.

According to the fourth aspect of the present invention, the movable electrodes are manufactured of an electrically conductive metal film, so the acceleration sensor need not be subject to width variation arising from side etching, presenting improved sensing accuracy.

According to the fifth aspect of the present invention, the depth of the grooves is at least 10 times as great as the distance between the movable electrode and the fixed electrode. The great distance between the bottom of the groove and the fixed electrode makes any stray capacity created between them negligible, preventing a performance drop in the acceleration sensor.

According to the sixth aspect of the present invention, the width across the movable electrode is substantially equal to the width across the fixed electrode. Therefore, the capacitance of the capacitor between the movable electrode and the fixed electrode is reliably changed in response to the displacement of the movable body, and the acceleration applied to the movable body can be reliably sensed.

According to the seventh aspect of the present invention, the grooves are expanded at the bottom to be wider than at the top. Even if a charge generated on a side wall of the groove creates a stray capacity between the side wall and the fixed electrodes, the distance between the side wall and the fixed electrodes is increased, the magnitude of the stray capacity is decreased, and the performance of the acceleration sensor is thus prevented from decreasing.

According to the eighth aspect of the present invention, the method of producing an acceleration sensor comprises the steps of: forming a first etching resistive film on a silicon monocrystalline substrate on the area that is to become the movable electrodes; forming the grooves in the silicon crystalline substrate using anisotropic etching; stripping the first etching resistive film; enlarging the bottom of the groove by isotropic etching with the side walls of the grooves covered with a second etching resistive film; and stripping the second etching resistive film. This method permits the movable body having the grooves with the expanded bottom and movable electrodes between the grooves to be easily manufactured.

According to the ninth aspect of the present invention, the method of producing an acceleration sensor comprises the steps of: forming, on a silicon crystalline substrate, a metal film that is to become the movable electrodes; and forming the grooves in the silicon monocrystalline substrate by isotropic etching. This method permits the movable body having movable electrodes with the metal film partly covering the grooves to be easily manufactured.

What is claimed is:

1. An acceleration sensor comprising:
   a first fixed substrate;
   a second fixed substrate;
   a fixed electrode mounted on said first fixed substrate;
   a movable body, sandwiched between said fixed substrates and displaced in response to an applied acceleration; and
   a movable electrode which is arranged in said movable body in such a manner that said movable electrode faces said fixed electrode to form, together with said fixed electrode, a capacitor, wherein said movable electrode is mounted between grooves formed in said movable body,
   wherein the depth of said grooves is at least 10 times as great as the distance between said movable electrode and said fixed electrode.

2. An acceleration sensor according to claim 1, wherein said movable electrode is manufactured of the same material as said movable body.

3. An acceleration sensor according to claim 1, wherein said movable body is manufactured of silicon monocrystal.

4. An acceleration sensor according to claim 1, wherein said movable electrode is manufactured of an electrically conductive metal film.

5. An acceleration sensor according to claim 1, wherein the width across said movable electrode is substantially equal to the width across said fixed electrode.

6. An acceleration sensor comprising:
   a first fixed substrate;
   a second fixed substrate;
   a fixed electrode mounted on said first fixed substrate;
   a movable body, sandwiched between said fixed substrates and displaced in response to an applied acceleration; and
   a movable electrode which is arranged in said movable body in such a manner that said movable electrode faces said fixed electrode to form, together with said fixed electrode, a capacitor, wherein said movable electrode is mounted between grooves formed in said movable body,
   wherein said grooves are expanded at the bottom to be wider than at the top.

* * * * *